(12) United States Patent
Cherry et al.

(10) Patent No.: US 7,321,435 B2
(45) Date of Patent: Jan. 22, 2008

(54) SYSTEM AND METHOD FOR AUTHORIZING PRINTING SERVICES

(75) Inventors: Darrel Cherry, Boise, ID (US); James Clough, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 932 days.

(21) Appl. No.: 10/074,793

(22) Filed: Feb. 11, 2002

(65) Prior Publication Data

US 2003/0151762 A1    Aug. 14, 2003

(51) Int. Cl.
*G06K 15/00* (2006.01)

(52) U.S. Cl. ..................... 358/1.14; 358/1.9

(58) Field of Classification Search ............... 358/1.15, 358/1.13, 1.14, 405, 407, 403, 402, 1.9; 709/223, 709/224, 225
See application file for complete search history.

(56) References Cited

U.S. PATENT DOCUMENTS

| | | | | |
|---|---|---|---|---|
| 5,633,932 | A | 5/1997 | Davis et al. | 380/25 |
| 6,313,921 | B1 * | 11/2001 | Kadowaki | 358/1.15 |
| 6,545,767 | B1 | 4/2003 | Kuroyanagi | |
| 6,711,677 | B1 * | 3/2004 | Wiegley | 713/151 |
| 6,801,935 | B2 * | 10/2004 | Shen | 709/219 |
| 6,859,832 | B1 * | 2/2005 | Gecht et al. | 709/224 |
| 6,862,583 | B1 * | 3/2005 | Mazzagatte et al. | 705/64 |
| 6,952,780 | B2 * | 10/2005 | Olsen et al. | 726/26 |
| 2002/0016921 | A1 | 2/2002 | Olsen et al. | |
| 2003/0014640 | A1 * | 1/2003 | Loyd | 713/182 |
| 2003/0069915 | A1 * | 4/2003 | Clough et al. | 709/100 |

FOREIGN PATENT DOCUMENTS

| | | | |
|---|---|---|---|
| JP | 2000047843 | | 2/2000 |
| JP | 2001298779 | * | 10/2001 |
| JP | 2003044232 | * | 2/2003 |
| JP | 2001340979 | * | 5/2003 |

OTHER PUBLICATIONS

European Search Report for EP Patent Application No. 03250680 filed Feb. 3, 2003. Report issued Sep. 29, 2005 (The Hague).

* cited by examiner

*Primary Examiner*—Jerome Grant, II

(57) ABSTRACT

A system and method for proper authorization of printing services is described. The system and method allows networks to control which users have access to printing services and the type of services they may utilize. In one exemplary implementation, the system supports a communications link, an agent, and a server. The agent provides an interface connection between a user and the communications link. The agent also assigns an authorization code to a header of a print job sent by the user. A monitoring device for the communications link receives the print job and verifies whether the authorization code is valid, prior to permitting the print job to be sent to a printer.

11 Claims, 4 Drawing Sheets

SYSTEM AND METHOD FOR AUTHORIZING PRINTING SERVICES

TECHNICAL FIELD

The present invention is related to printer services in a public networked environment, and more particularly, to proper authorization of such services.

BACKGROUND

In a typical public communication network center, multiple authorized users (or clients) may have access to a communication network. One challenge for the centers is to protect the integrity of their printing equipment from unauthorized use. Public communication network centers run a security risk of tampering or unauthorized access to printers, if they are unable to authenticate print jobs submitted on their network. Additionally, a user may gain access to printing services that the user is not entitled, if printer authentication is insecure. Examples of printing services that a communication network center may desire to secure include: setting page limits for print jobs, permitting color printing, permitting photo quality printing, charging fees for printing quantities and/or qualities, providing particular access to a particular printer per user, and other related printing services.

Another challenge for public networked printing centers is the ability to authenticate print jobs when they are received via a virtual private network (VPN) or related Internet technique. Authorized users on a public intranet network may submit print jobs to printers located on the public network through their VPN. To the public intranet network, however, this print job may appear to have no relation to the authorized user, since it ultimately is received by the network through the Internet.

Some public networks attempt to use digital certificates as a means to authenticate a print job before permitting it to be printed, but digital certificates cannot readily restrict a user on a recurring basis without having them re-register or interact with the system manually; both of which are laborious processes.

SUMMARY

A system and method for proper authorization of printing services is described. The system and method allows public communication networks to control which users have access to printing services and the type of services they may utilize. In a described implementation, the method supports retrieving an authorization code and assigning it to a header of a print job. If the authorization code is valid, then the print job is sent to a printer. On the other hand, if the authorization code is invalid, then the print job is denied and no printing is authorized.

BRIEF DESCRIPTION OF THE DRAWINGS

The detailed description is described with reference to the accompanying figures. In the figures, the left-most digit(s) of a reference number identifies the figure in which the reference number first appears.

DETAILED DESCRIPTION

Figure 1:
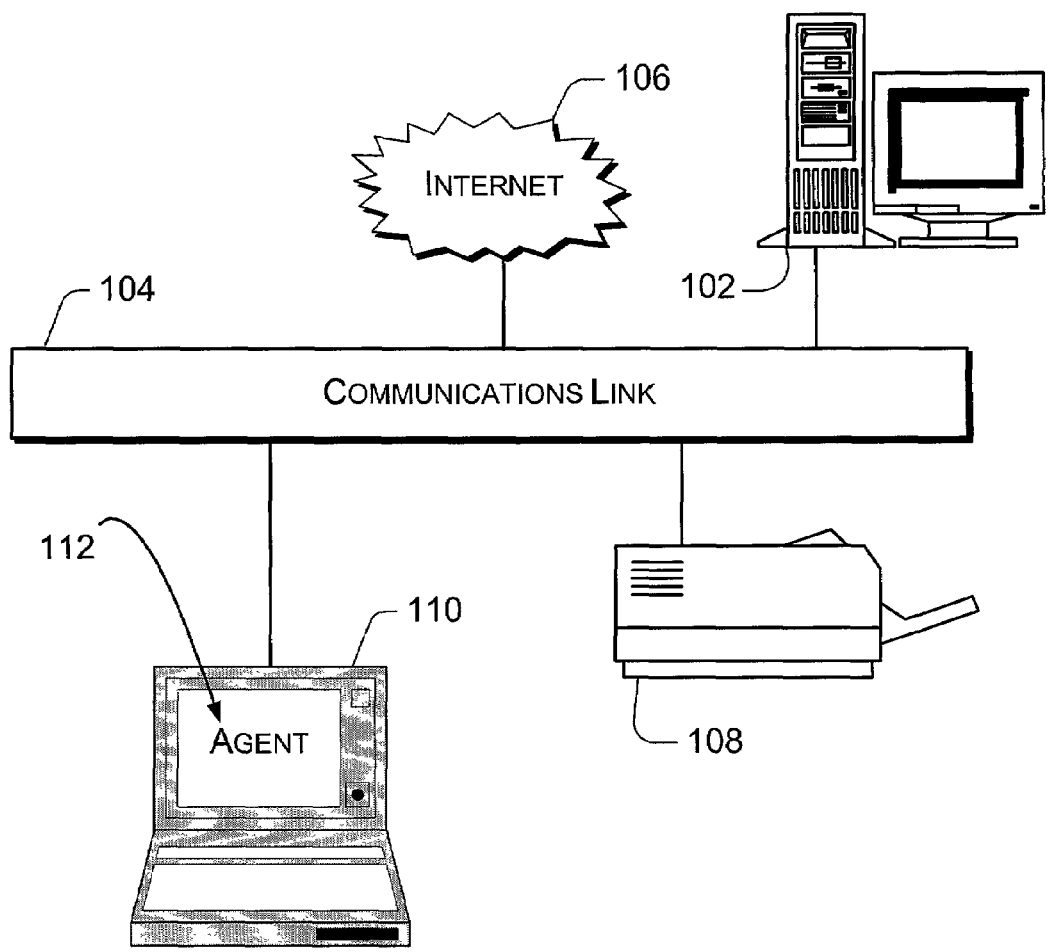
FIG. 1 illustrates an exemplary public communication system with printing service capability.

FIG. 1 illustrates an exemplary public communication system 100 with printing service capability. As a public communication system 100, system 100 is typically implemented as a public intranet service to one or more users. A hotel, business center, airport travel center, Internet café, copier center are illustrations of the type of public communication systems 100 that may desire to authorize printing services, prior to permitting a print job to be processed. System 100 includes a monitoring device 102, a communications link 104, an Internet portal site 106, a printer 108, a client 110 and an agent 112. System 100 may include a plurality of the any of the aforementioned devices.

Monitoring device 102 monitors print requests on system 100. That is, monitoring device verifies whether print jobs submitted by client 110 are authorized. Monitoring device 102 may be implemented as a server, a shared computer, a print request computer, or as a software application running on a host device, such as a computer. Monitoring device 102 should have the capability to access a database (internal or external to device 102) as shall be described in more detail.

Communications link 104 serves as a communications channel between devices connected to it. That is, print jobs submitted to a printer 108 use communications link 104 as path for transferring information. Communications link 104 may be implemented as a network (local and wide area, etc.), a switch, a bus, or other related means to provide wired or wireless communication between devices.

Internet portal site 106 serves as an optional gateway to the Internet for devices associated with system 100. Most public communication systems 100 provide access to and from the Internet, including the ability for a client 110 to send a print job from an offsite enterprise host (not shown) to a local printer 108 in proximity to client 110. The connection between client 110 and the offsite enterprise host may be accomplished through a VPN, Hyper Text Transfer Protocol (HTTP), HTTP Secure (HTTPS) and other related protocol communications between client 110 and an offsite enterprise host.

Printer 108 is any type of printing device that may be used in system 100. As used herein, "printer," "printer device" or the like, means any electronic device having data communications, data storage capabilities, and/or functions to render printed characters and images on a print media. A printer device may be a printer, fax machine, copier, plotter, and the like. The term "printer" includes any type of printing device using a transferred imaging medium, such as ejected ink, to create an image on a print media. Examples of such a printer can include, but are not limited to, laser printers, inkjet printers, plotters, portable printing devices, as well as multi-function combination devices.

Client 110 is a user operated device capable of sending a print job request. Client 110 may be implemented as a portable electronic device, such as a portable digital assistant (PDA), a laptop computer, a wireless handset telephone and other related devices. Client 110 may also be implemented more generally as a computer. As used herein "computer" means any electronic device or software running on a device that is capable of processing print data in some manner.

Agent 112 is typically implemented in some functional media such as software executing commands on behalf of monitoring device 102. Agent 112 further serves as an interface between communications link 104 and client 110. In other words, agent 112 permits a client 110 to gain access to communications link 104. In one implementation, agent 112 can be installed on the client 110 during a log-on period to system 100. Accordingly, agent 112 can run on client 110, such as an executable program that may or may not run in the back ground or as a HTML page that appears on the client's web browser (not shown). In other implementations, agent 112 could also be selected to run on a network, switch, server or related devices in communication with client 110. Monitoring device 102 can request that the client 110 load agent 112 as a requisite to gaining access to system's 100 intranet site. Prior to being installed on the client 110, agent 112 typically resides on an internal hard disk drive (not shown) or portable media drive (not shown) in monitoring device 102, or other server related device connected to link 104. Examples of suitable portable storage media include DVD, floppy disks, CD-ROM, and so forth.

Figure 2:
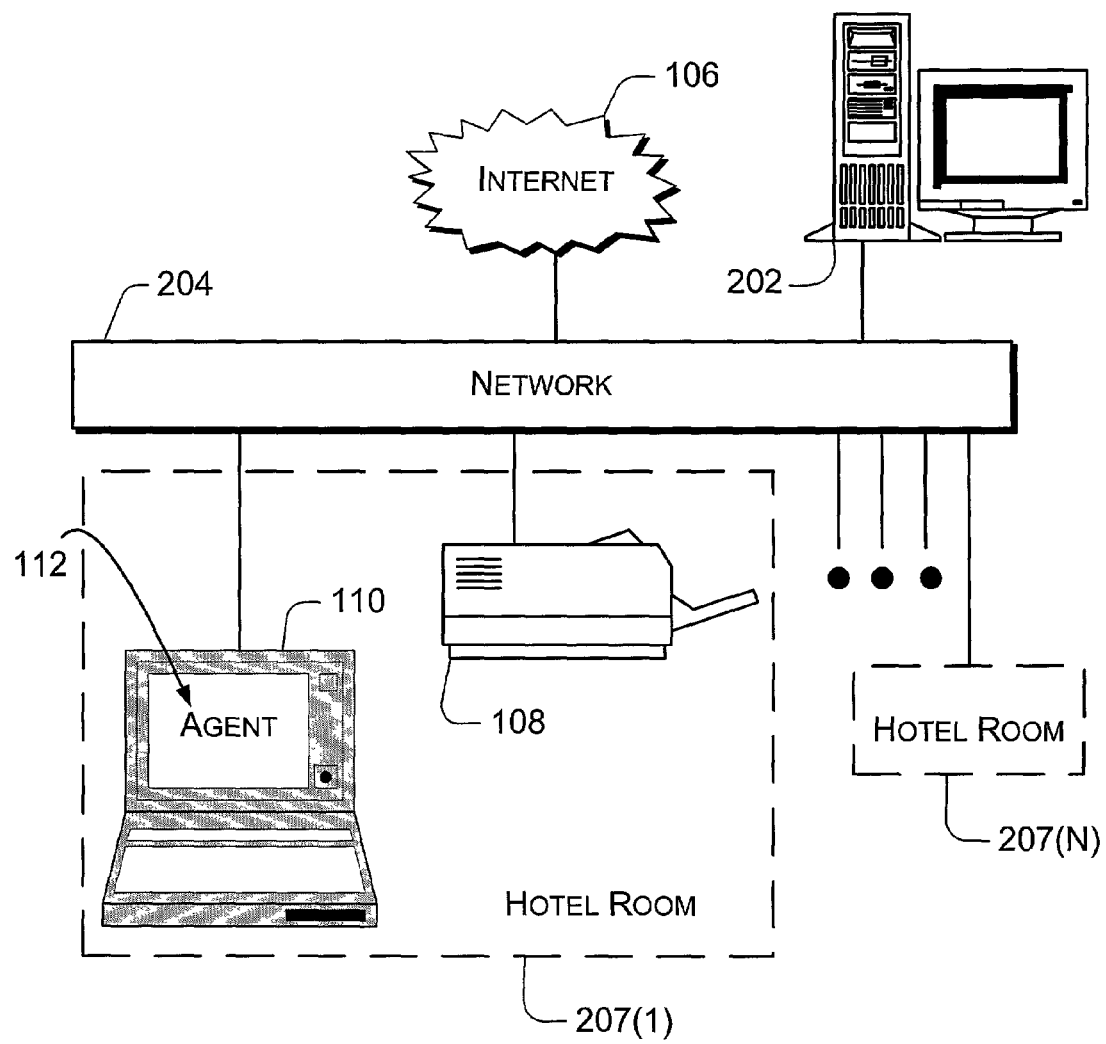
FIG. 2 illustrates an exemplary hotel public communications system.

FIG. 2 illustrates an exemplary hotel public communications system 200. In this implementation, monitoring device 102 is implemented as server 202 and communications link 104 is implemented as a local area network 204 with broadband connectivity, such as cable or Ethernet. Accordingly, each hotel room 207 is optionally equipped with broadband access ports, permitting a user to connect the client 110 (such as a laptop computer) to the network 204. As shown in FIG. 2, each room 207 is optionally equipped with its own printer 108, permitting the user to have the convenience of printing locally. The client 110 may also have the option of printing to other locations such as a front desk printer, conference room printer, etc.

As will be described in more detail, systems 100 and 200 are equipped with the operable capability to validate and authorize print jobs. Systems 100, 200 can be implemented to authorize or deny a print job based on the source of the print job, printer selected, quality of print media selected, quality of print job requested (dpi, color, black & white, photo quality and so forth), page quantity, document collation, duplication of copies, stapling and other various optional copier/printing parameters.

Figure 3:
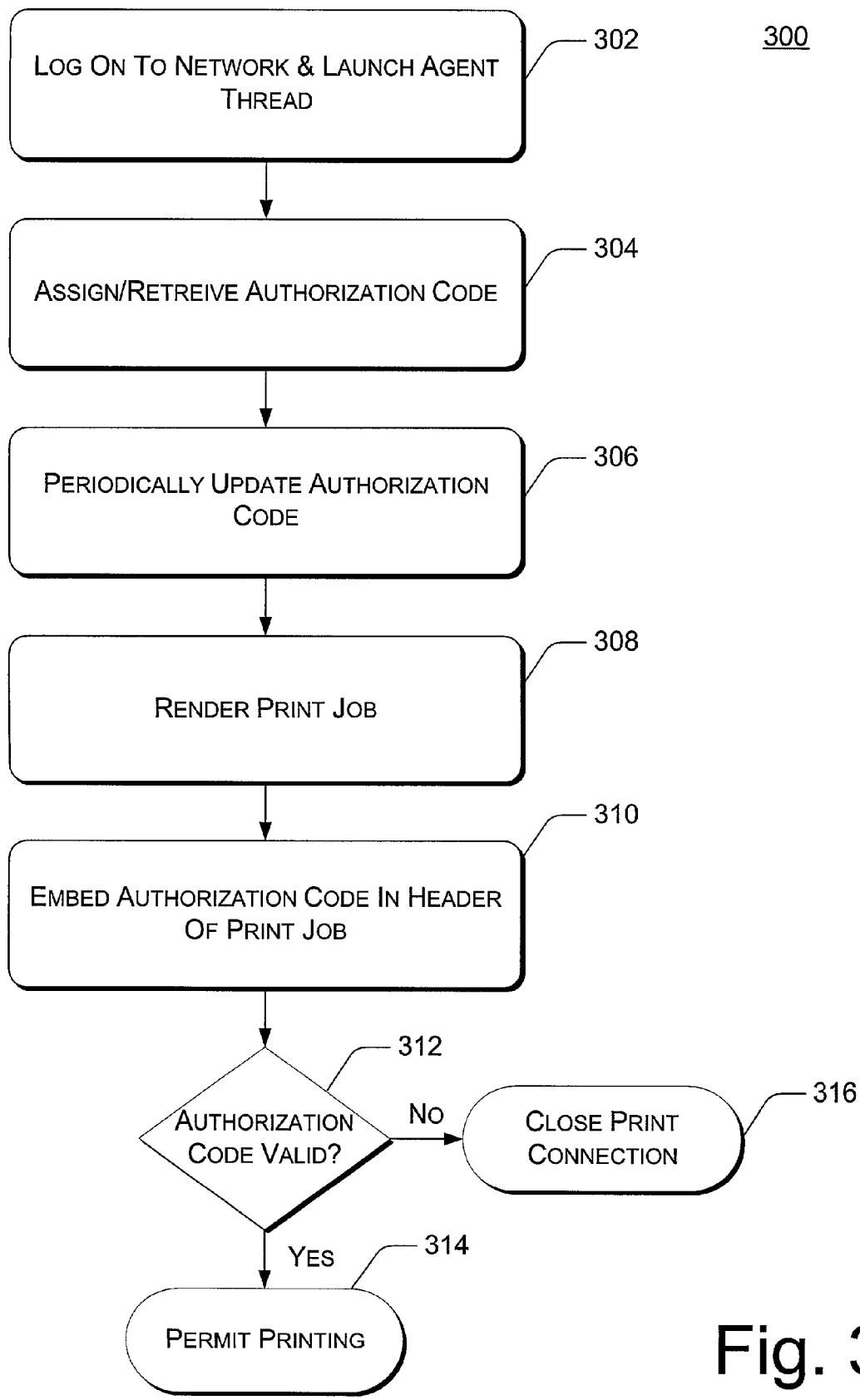
FIG. 3 is a flow chart illustrating a process for authorizing printing services.

FIG. 3 is a flow chart illustrating a process 300 for authorizing print services in system 100. Process 300 can be implemented in one or more computer-readable media (disks, memory, CD, DVD, etc.) with computer instructions that, when executed, perform the steps illustrated therein.

Referring to FIGS. 1-3, in a step 302, a client 110 logs-on to communications link 104. Client 110 may log-on to link 104 through any standard client/server process. Client 110 typically uses a web browser (not shown) to initiate communications with network related devices such as monitoring device 102 or specifically, server 202.

An Agent 112 in the form of a thread is sent from monitoring device/server 102, 202 and loaded onto the client 110. Agent 112 immediately communicates with monitoring device/server 102, 202 using standard TCP/IP protocols. Of course, other communication protocols can be used in place of TCP/IP, such as IPX/SPX. For convenience purposes, agent 112 is typically running in the background and is invisible to the user.

In step 304, monitoring device/server 102, 202 assigns an authorization code to client 110. Typically the authorization code is created and installed in a database (not shown) on some type of storage media internal to monitoring device 102 or other device accessible to monitoring device/server 102, 202. The authorization code can either be created prior to a user logging onto system 100, 200 or can be created in real-time upon the user initiating a log-on routine to system 100, 200. Once the authorization code is created, it is assigned to a particular client 110 or is used by all client devices logged on to system 100, 200. Agent 112 retrieves the authorization code from the database and stores the code locally on client 110. The authorization code can be updated on a periodic basis. There can be authorization codes (security codes) for each device, for subsets of devices, or only one authorization code, used for all devices.

Figure 4:
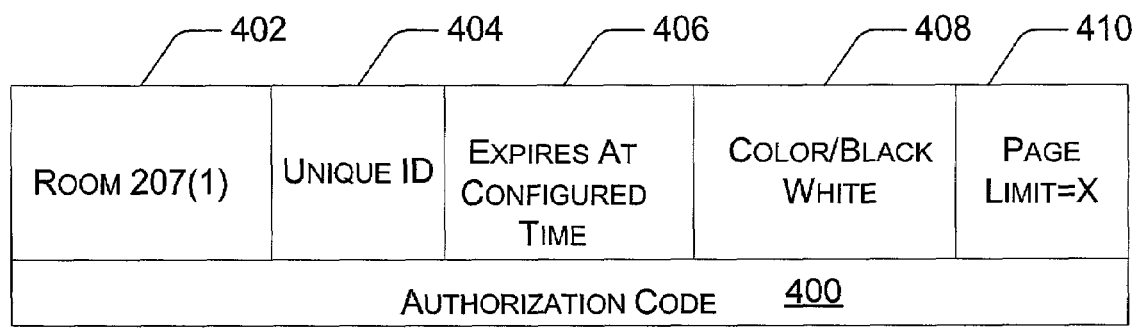
FIG. 4 illustrates one implementation of an authorization code.

FIG. 4 illustrates an exemplary implementation of an authorization code 400 used in relation to hotel public communications system 200. The authorization code 400 includes one or more embedded parameters that enable monitoring device/server 102, 202 to uniquely identify a print job. Furthermore, each parameter (as well as the authorization code 400 as a whole) can be used by the monitoring device/server 102, 202 as a basis for accepting or denying a print job as is explained herein. For purposes of illustration, the exemplary authorization code 400 includes parameters 402-410.

A destination/source parameter 402 provides the destination/source of the authorization code, e.g., room 207(1). The destination/source parameter 402 also serves as way to confine a print job to a printer 108 local to client 110 in room 207(1) or printers located in other rooms that client 110 has privileges to request a print job be performed.

A unique identifier parameter 404 provides a security code that can be reconfigured on a frequent basis to increase security. For instance, parameter 404 may configured to change once a day, every six hours, every hour and so forth. Additionally, an expiration parameter 406 can be used as a flag for monitoring device to check to ensure that an authorization code 400 is not stale. For instance, monitoring device/server 102, 202 may be notified of a check out date for a particular user and insert this date as an expiration field in authorization code 406.

A quality of service parameter 408 can also be embedded in authorization code 400. In the exemplary illustration, quality of service parameter 408 delineates whether a user has access to print in color or is limited to black and white. As mentioned above, additional quality of service parameters can be selected depending on the application.

Authorization code 400 can also be embedded with a page limit parameter 410. For instance if a user pre-pays in advance of printing for 100 pages then the page limit parameter can be set to 100. If one or more print jobs exceed the 100 page limit set in parameter 410 then the monitoring device can deny a print job based on this parameter.

In step 306, it is possible that monitoring device/server 102, 202 periodically update one or more parameters of the authorization code 400. For instance, the monitoring device/server 102, 202 can be implemented to change the authorization code on a periodic basis to increase security. Accordingly, agent 112 can be instructed to periodically check with monitoring device/server 102, 202 to make sure that the authorization code remains updated.

In step 308 a user will perform a print operation on client 110 to render a print job request. Typically, a user will perform the print operation with standard off-the-shelf software applications via a Windows based, UNIX or other operating system printing application. For instance, a user selects the "File" icon and initiates a print operation via the "Print" icon. A print job is rendered with a driver (not shown) and sent to a spooler (not shown) and then a port monitor (not shown) all of which are standard items in most printing environments. Next, the port monitor sends the print job to agent 112. Agent 112 then obtains the Media Access Control (MAC) address and any other information needed from client 110 to send the print job to printer 108.

Next, in step 310, agent 112 embeds the assigned authorization code 400 into the header of the print job request to be sent. The authorization code could be elsewhere, such as in the job itself, in the body of the HTTP request, as an HTTP variable, or as part of a SOAP request over HTTP. Agent 112 then sends the print job request to monitoring device/server 102, 202 including any print data which can be in raw, compressed, intermediate or other related formats. Typically, agent 112 sends the aforementioned data to monitoring device/server 102, 202 via HTTP, HTTPS, FTP or other communication protocol.

Next, in a decisional step 312, monitoring device/server 102, 202 receives the print job request from agent 112 (via client 110) and checks whether the authorization code is valid. Monitoring device/server 102, 202 determines the validity of the authorization code by comparing the authorization code assigned to a particular client 110 that is stored in the database, to the authorization code received in the print job request. If the authorization codes match, then monitoring device/server 102, 202 has determined that the authorization code is valid, and according to the "YES" branch printing is permitted. The monitoring device/server 102, 202 then allows the print job to be connected to the authorized printer 108 selected by the client 110.

If the authorization codes do not match, then monitoring device/server 102, 202 has determined that the authorization code is not valid, and according to the "NO" branch printing is not permitted. The connection between client 110 and printer 108 is immediately closed. Thus, any printing associated with invalid authorization code is disabled.

Depending on the sophistication of the authorization code 400, in decisional step 312, monitoring device/server 102, 202 can also determine whether client 110 is entitled to print in color (via parameter 408), whether the page limit has been exceeded (via parameter 410), whether room 207(1) is entitled to print to printer 108 (via parameter 402) and so forth. If any of the parameters do not match or are exceeded, then the print connection can be denied by monitoring device/server 102, 202. Otherwise, so long as the authorization code matches, including all parameters therein, the monitoring device/server 102, 202 will permit a print job request to be connected with its selected destination printer.

In the case of a client 110 VPNed back to their enterprise Intranet, monitoring device/server 102, 202 will receive the print job request with the authorization code 400 embedded in the header, even though the print job will be received from Internet port 106. Accordingly, monitoring device/server 102, 202 is able to verify that the print job is valid according to decisional step 312 described above, even though it appears to be received from a source that is not local to system 100, 200.

Thus, although the invention has been described in language specific to structural features and/or methodological acts, it is to be understood that the invention defined in the appended claims is not necessarily limited to the specific features or acts described. Rather, the specific features and acts are disclosed as exemplary forms of implementing the claimed invention.

What is claimed is:

1. A method comprising:
   rendering a print job with a client computer;
   sending an authorization code to the client computer from a monitoring device remotely located relative to the client computer;
   subsequently sending the print job with the authorization code from the client computer to the remote monitoring device;
   the remote monitoring device checking whether the authorization code is valid;
   enabling printing of the print job upon determining that the authorization code is valid; and
   disabling printing of the print job by a printer remote from the remote monitoring device upon determining that the authorization code is invalid.

2. The method as recited in claim 1, wherein the authorization code sent to the client computer from the remote monitoring device is received by an agent operating on the client computer.

3. The method as recited in claim 1, wherein the authorization code comprises an expiration interval parameter.

4. One or more computer-readable media comprising computer-executable instructions that, when executed, perform the method as recited in claim 1.

5. In a public computer service center where multiple computers can be connected to a communications link associated with the service center, a method comprising:
   creating a request to log on to the communications link;
   rendering a print job with the client computer;
   sending an authorization code from a host located on the communications link to a client computer located on the communications link;
   embedding the authorization code in a header of the print job;
   subsequently sending the print job with the embedded authorization code from the client computer to a printer; and
   checking whether the authorization code is valid, prior to enabling or disabling the print job from printing.

6. The method as recited in claim 5, wherein the public computer service center is a hotel.

7. The method as recited in claim 5, wherein the public computer service center is an airport-based printing center.

8. The method as recited in claim 5, wherein the authorization code contains an expiration interval parameter.

9. The method as recited in claim 5, wherein the authorization code contains a quality of service parameter.

10. The method as recited in claim 5, wherein an agent operating on the client computer receives the authorization code sent from the host and assigns the authorization code to the print job.

11. One or more computer-readable media comprising computer-executable instructions that, when executed, perform the method as recited in claim 5.

* * * * *